United States Patent [19]

Sakuma et al.

[11] Patent Number: 4,759,620
[45] Date of Patent: Jul. 26, 1988

[54] BACK-MIRROR DEVICE FOR SMALL-SIZED VEHICLES

[75] Inventors: Tsutomu Sakuma, Shiki; Tamotsu Miura, Yokohama; Toshiaki Kishi, Tokyo, all of Japan

[73] Assignee: Honda Giken Kogyo Kabushiki Kaisha, Tokyo, Japan

[21] Appl. No.: 945,615

[22] Filed: Dec. 23, 1986

[30] Foreign Application Priority Data

Dec. 25, 1985 [JP] Japan ............................ 60-290788
Mar. 7, 1986 [JP] Japan ............................ 61-33015[U]

[51] Int. Cl.⁴ .......................... B60R 1/06; G20B 7/18; G20B 5/08
[52] U.S. Cl. ................................... 350/604; 350/632; 248/900; 248/475.1; 248/486
[58] Field of Search ............... 350/604, 606, 631, 632, 350/600, 590, 584; 248/900, 549, 475.1, 486

[56] References Cited

U.S. PATENT DOCUMENTS 3,730,474  5/1973  Bowers .......................... 248/900
4,585,316  4/1986  Knutson et al. ................. 350/582

FOREIGN PATENT DOCUMENTS

3248759  7/1984  Fed. Rep. of Germany ...... 350/632
58-49538  3/1983  Japan .
59-32534  2/1984  Japan .
60-17429  5/1985  Japan .
2130990A  6/1984  United Kingdom .

Primary Examiner—Jon W. Henry
Attorney, Agent, or Firm—Armstrong, Nikaido, Marmelstein & Kubovcik

[57] ABSTRACT

A back-mirror device for small-sized vehicles of the type that a back-mirror is mounted to an upper side portion of a fairing which covers a front portion of a vehicle body by the intermediary of an arm member projecting from the side portion. The arm member is provided with an opening which penetrates through the arm member in the direction of running of the vehicle, hence upon running of the vehicle, running wind blows through the opening from the forth to the rear, and thereby an air resistance is reduced. Among two arm portions separated to the above and the below by the opening, one arm portion is may be made to be able to avoid an external load by separation or bending in the event that an external load exceeding a predetermined amount is applied thereto, and the other arm portion could be provided with a flexible vibration-absorptive member.

3 Claims, 7 Drawing Sheets

BACK-MIRROR DEVICE FOR SMALL-SIZED VEHICLES

BACKGROUND OF THE INVENTION

The field of the present invention relates to small-sized vehicles such as motorcycles, motor tricycles and the like.

In the above-referred small-sized vehicles, normally there is provided a fairing for covering a front portion of a vehicle body over its front surface as well as its both left and right side surfaces. And in a vehicle provided with such fairing rear view or, back-mirrors are mounted at the upper side portions of the fairing via an arm members projecting from the side portions as disclosed for example, in Japanese Utility Model Publication No. 60-17429. Also, in Laid-Open Japanese Patent Specification No. 58-49538 is disclosed a back-mirror device which is constructed in such manner that when on external load is applied thereto it may turn to avoid the external load. In these back-mirror devices, the above-mentioned arm member becomes thick and has a large wind pressure area because it must rigidly support the back-mirror so as not to induce rocking or vibration, and moreover, as it project to the side of the vehicle body, an air resistance upon running of the vehicle would be increased by this arm member.

A back-mirror device having a structure in which the arm member is made of two parts taking into consideration an aerodynamic characteristic, is known by Laid-Open Japanese Patent Specification No. 59-32534. In this back-mirror device, an arm member for supporting a mirror is formed of two thin arm portions. However, this cannot fully prevent vibration of a mirror resulted from running of a vehicle.

SUMMARY OF THE INVENTION

The present invention relates to improvements in the heretofore known back-mirror device as described above, and has it as an object to provide a back-mirror device in which a back-mirror is rigidly supported by an arm member that has a small air resistance but yet has sufficient rigidity, and has excellent external appearance.

To that end, according to the present invention, in a back-mirror device for small-sized vehicles of the type that a rear view mirror is mounted to an upper side portion of a fairing which covers a front portion of a vehicle body by the intermediary of an arm member projecting from the side portion, the above-mentioned arm member is provided with an opening which penetrates through the arm member in the direction of running of the vehicle.

According to the present invention, since running wind striking the arm member would smoothly flow backwards through an opening at a central portion, an air resistance is reduced. Moreover, this opening would not largely affect the rigidity of the arm member, and the arm member holds a high rigidity owing to arm portions respectively formed above and below the opening and spaced from each other, and can firmly support a back-mirror.

In addition, according to the present invention there is provided a back-mirror device which can effectively avoid an external load in the event that the external load has been applied to a mirror, which comprises an aerodynamically excellent arm member, and which can prevent vibration of a mirror caused by vibration of a vehicle body as such as possible.

DETAILED DESCRIPTION OF PREFERRED EMBODIMENTS

Figure 1:
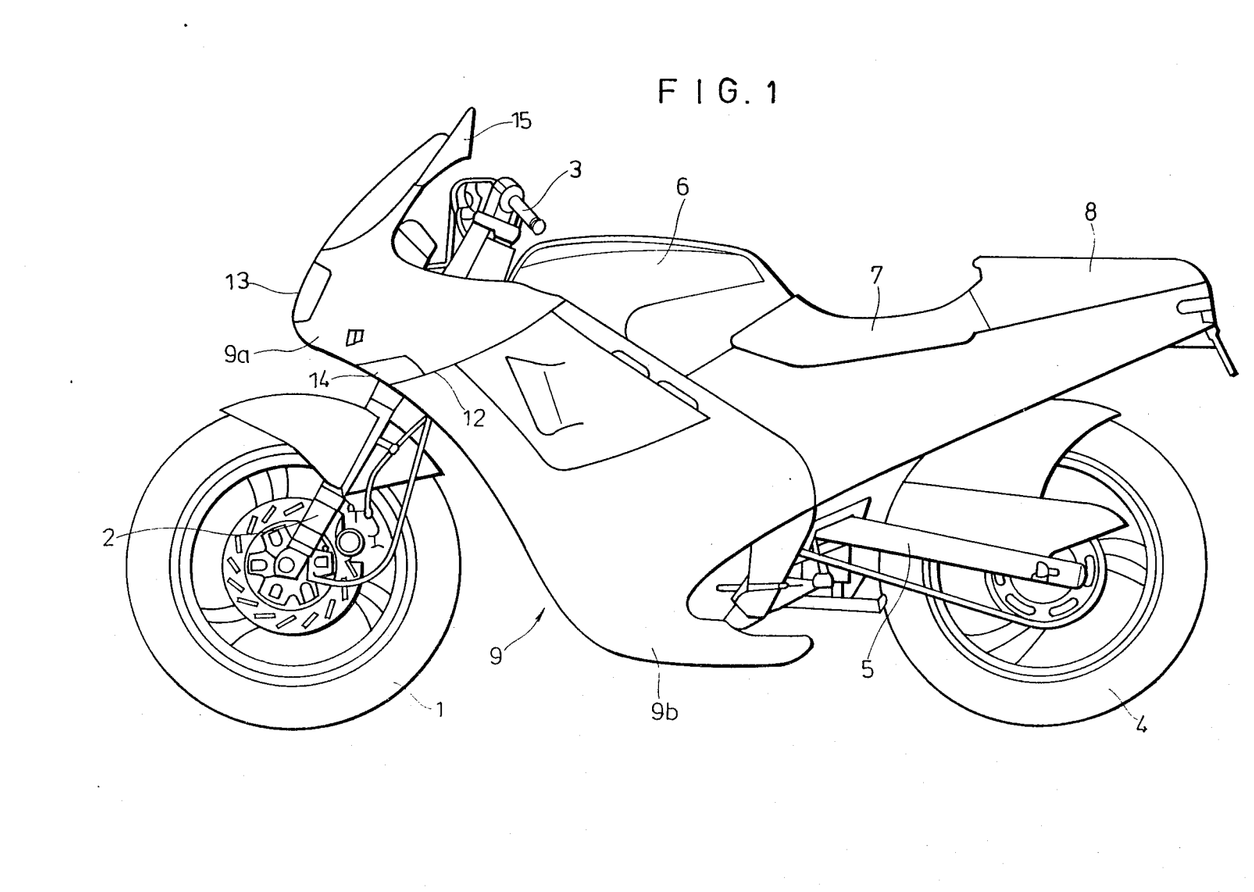
FIG. 1 is a side view of a motorcycle provided with a back-mirror device according to a first preferred embodiment of the present invention.
Figure 2:
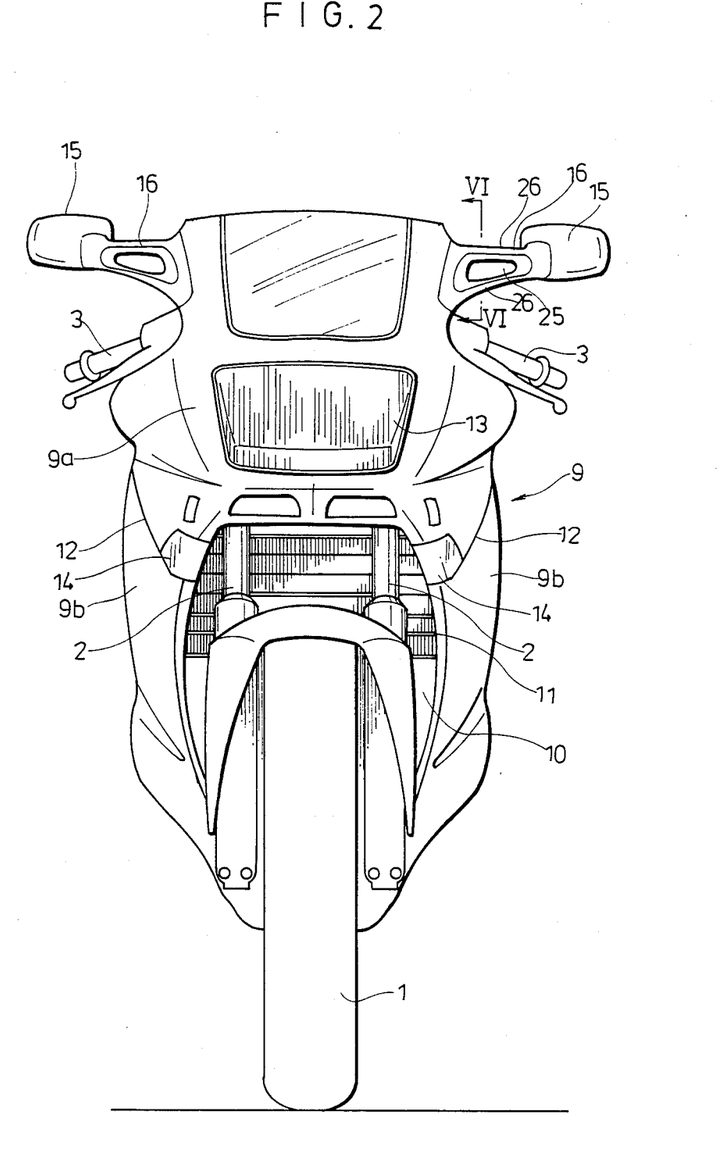
FIG. 2 is a front view of the same motorcycle.

FIG. 1 is a side view of a motorcycle to which the present invention has been applied, and FIG. 2 is a front view of the same. A front wheel 1 is suspended by a front fork 2, and this front fork 2 is connected at its top end to a handle bar 3 via a handle rotary shaft. A rear wheel 4 is rotatably supported at a rear end of a rear fork 5 that is rockably supported from a vehicle body frame. At the rear of the handle bar 3 are sequentially disposed a fuel tank 6, a seat 7 and a rear-seat 8 along a center line of the vehicle body. A front portion of the vehicle body is covered by a fairing 9. The fairing 9 extends over the front surface and the left and right side surfaces of the vehicle body, and an opening 10 is formed in the lower portion of its front surface. The above-mentioned front wheel 1 and the front fork 2 are led out to the exterior through this opening 10. Upon running, running wind would flow into the interior of the fairing 9, and would cool a radiator 11 and an engine mounted at the rear lower position of the radiator.

Figure 3:
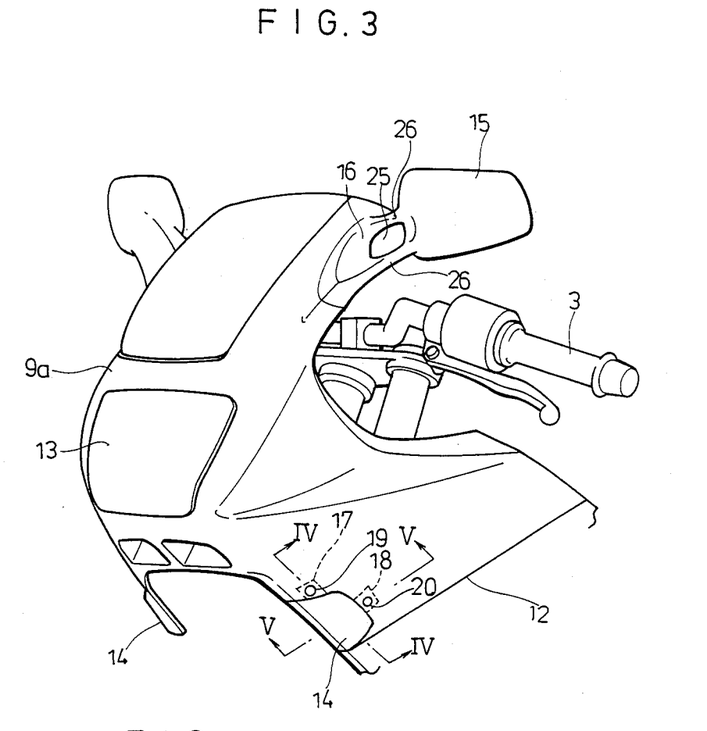
FIG. 3 is a perspective view of an upper fairing of the same motorcycle.
Figure 4:
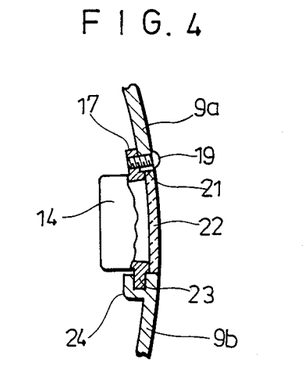
FIG. 4 is a cross-section view taken along line IV—IV in FIG. 3 as viewed in the direction of arrows.
Figure 5:
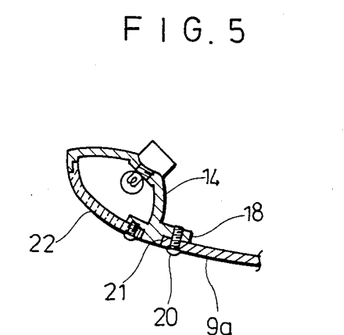
FIG. 5 is a cross-section view taken along line V—V in FIG. 3 as viewed in the direction of arrows.

The fairing 9 is divided into an upper fairing 9a and a lower fairing 9b at a severing line 12, and they are respectively mounted to the vehicle body. At the front central portion of the upper fairing 9a is provided a head light 13, and at the lower edge portion of the upper fairing 9a are provided a pair of left and right front winkers 14 in the front surface portions along the severing line 12 as positioned on the opposite sides of the opening 10, as shown in FIGS. 3 and 5. In addition, at the upper portion of the upper fairing 9a are mounted rear view or back-mirrors 15 as projecting sidewards via arm members 16. FIG. 3 is a perspective view of the upper fairing 9a.

Each of the front winkers 14 is mounted to the front portion at the lower edge of the upper fairing 9a by placing mount pieces 17 and 18 projecting from its upper edge and its rear edge along the inner surface of the upper fairing 9a and fastening them with bolts 19 and 20, respectively. In the upper fairing 9a are formed notches 21 each of which conforms to the profile of the front surface of the front winker 14, and when the front edge portion of the front winker is fitted in this notch 21, and outer surface of a lens of the front winker 14 forms a surface that is flush with the outer surface of the upper fairing 9a, that is, an extension surface that is smoothly continuous to the outer surface of the upper fairing 9a. At the lower edge portion of the front winker 14 is provided a plug piece 23 as projected therefrom, and by inserting this insert piece 23 into a forked receptacle 24 formed at the upper edge of the lower-fairing 9b, the lower edge of the front winker 14 can be detachably supported from the lower fairing 9b. The outer surface of the lower fairing 9b and the outer surface of the lens 22 also form a smoothly continuous single surface.

Figure 6:
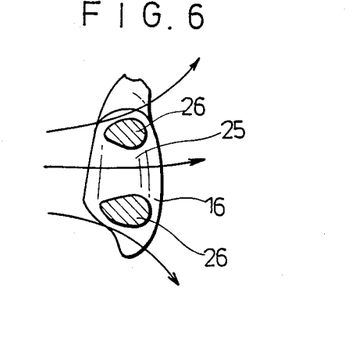
FIG. 6 is a cross-section view taken along line VI—VI in FIG. 2 as viewed in the direction of arrows.

The back-mirror 15 is provided at the upper side portion of the upper fairing 9a via the arm member 16 as projected therefrom as described above, an opening 25 penetrating through the arm member 16 in the back and forth direction, that is, from the forward to the rear side of the mirror housing is formed in the arm member 16, and the arm member 16 is divided into upper and lower arm portions 26, 26 by this opening 25. As shown in FIG. 6, the respective arm portions 26, 26 have a transverse cross-section of stream line shape that expands gradually from the forth towards the rear, and hence, upon running, running wind striking this arm member 16 would favorably pass through the outside of the arm member 16 and through the opening 25 as guided by the arm portions 26, 26. Accordingly, it can be avoided that either a large wind pressure acts upon the arm member 16 due to the running wind or vortexes are generated behind the arm member 16 and a resistance force due to these vortexes is exerted upon the arm member. Furthermore, since this arm member 16 consists of two arm portions 26, 26 disposed above and below as spaced from each other, the arm member 16 has a large rigidity and can firmly support the back-mirror 15. Moreover, the above-mentioned two arm portions 26, 26 are formed by providing the opening 25 in the arm member 16, the back-mirror is mounted to the upper fairing 9a by the intermediary of this integral arm member 16, and so, the external appearance is improved. The cross-section configuration of the arm portion 26 could be modified into a shape contracting gradually from the forth towards the rear.

Figure 7:
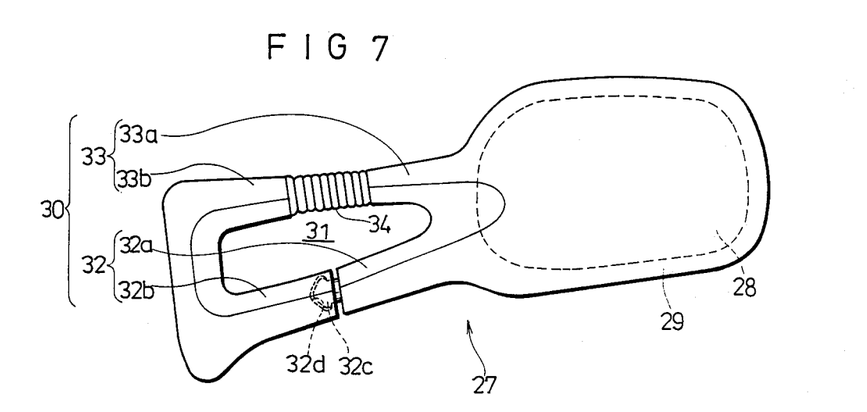
FIG. 7 is a perspective view of a back-mirror device according to a second preferred embodiment of the present invention.
Figure 8:
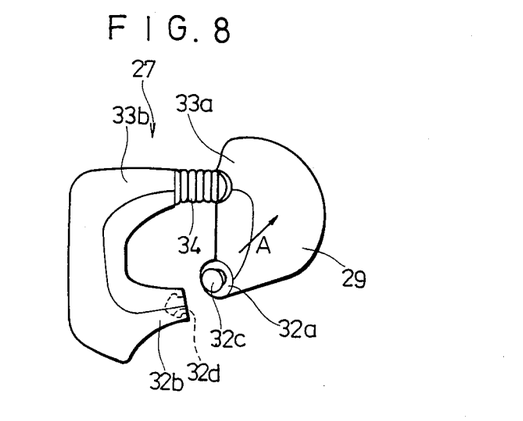
FIGS. 8 and 9 are perspective views for explaining operations of the same back-mirror device.
Figure 9:
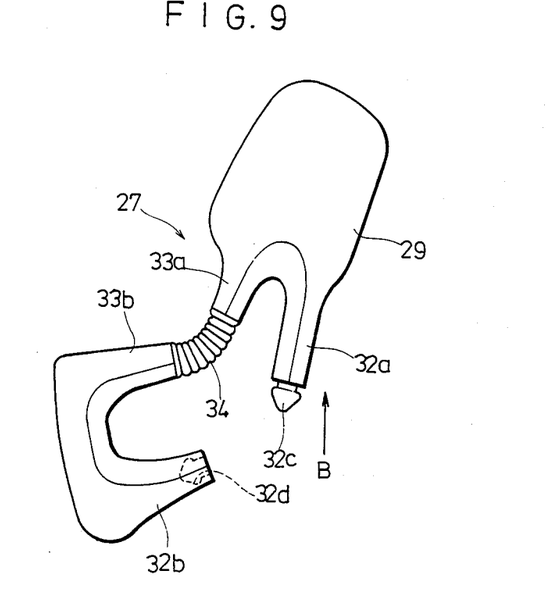

FIGS. 7 to 9 show a back-mirror device 27 according to a second preferred embodiment of the present invention. This back-mirror device 27 consists of a mirror 28, a housing 29 for holding the mirror 28, and an arm member for connecting the housing 29 with the above-mentioned upper fairing 9a. The arm member 30 is provided with an opening 31 that is similar to the above-described opening 25, and by this opening 31, a main arm portion 32 at the below and an auxiliary arm portion 33 at the above are formed.

The above-mentioned main and auxiliary arm portions 32 and 33 are respectively divided into housing side arm parts 32a and 33a formed integrally with the above-mentioned housing 29 and fairing side arm parts 32b and 33b mounted to the side portion of the upper fairing 9a. On the housing side arm part 32a of the main arm portion 32 is provided a mushroom-shaped protrusion 32c, and on the fairing side arm part 32b is provided a fitting bore 32d into which the protrusion 32c is to be fitted. The housing side arm part 32a and the fairing side arm part 32b are coupled together by fitting the mushroom-shaped protrusion 32c into the fitting bore 32d. However, it is to be noted that they are constructed in such manner that if an external load exceeding a predetermined amount is applied to the side of the mirror 28, the protrusion 32c is disengaged from the fitting bore 32d, and thereby the external load can be avoided.

Between the housing side arm part 33a of the auxiliary arm portion 33 and the fairing side arm part 33b is provided a member 34 having flexibility and a vibration absorbing characteristic, and therefore, vibration of the mirror 28 caused by vibration of the vehicle body can be prevented and the mirror 28 would not be disengaged from the vehicle body owing to the auxiliary arm portion 33, even if the protrusion 32c is disengaged from the fitting bore 32d. The auxiliary arm portion 33 is constructed in such member that if an external load exceeding a predetermined amount is applied to the side of the mirror 28, the external load can be avoided by the flexibility of the member 34 similarly to the case of the above-described main arm portion 32.

The arm member 30 constructed in the above-described manner is mounted to the side portion of the upper fairing 9a in such fashion that the main arm portion 32 may be positioned at the forth or forward and lower location and the auxiliary arm portion 33 may be positioned at the rear and upper location. Consequently, in the event that during running an external load exceeding a predetermined amount is applied to the side of the mirror 28 from the forth (in the direction of arrow A in FIG. 8), the arm member 30 can immediately avoid the external load by the main arm portion 32 positioned at the forth being separated or bent, and therefore, a response characteristic to the external load applied from the forth is excellent. In addition, when the vehicle sinks such as upon getting on, in the event that an external load exceeding a predetermined amount is applied to the side of the mirror 28 from the below (in the direction of arrow B in FIG. 9), also the arm member 30 can immediately avoid the external load by the main arm portion 32 positioned at the below being saparated or bent, and therefore, a response characteristic to the external load applied from the below is also excellent.

Figure 10:
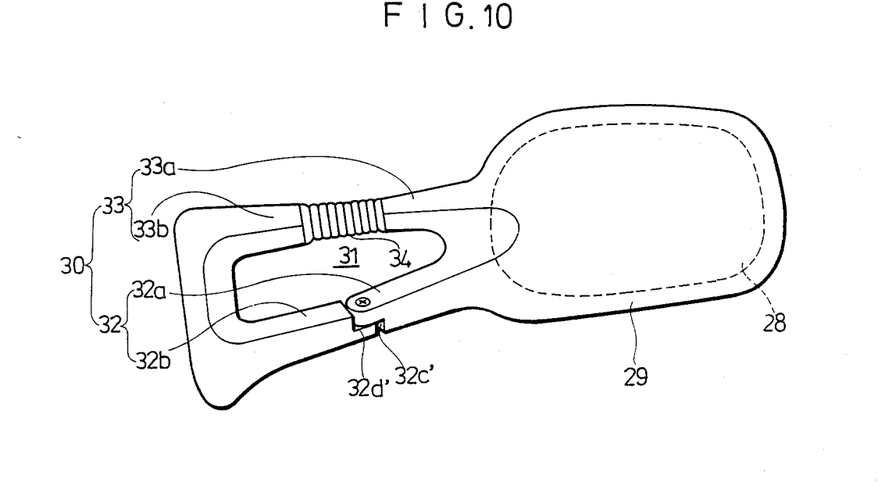
FIG. 10 is a perspective view of a back-mirror device according to a third preferred embodiment of the present invention;.
Figure 11:
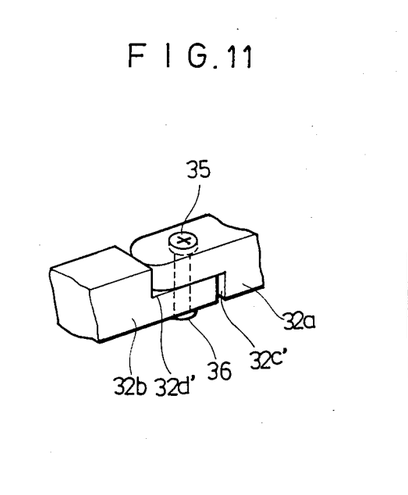
FIG. 11 is a partial enlarged perspective view of FIG. 10.
Figure 12:
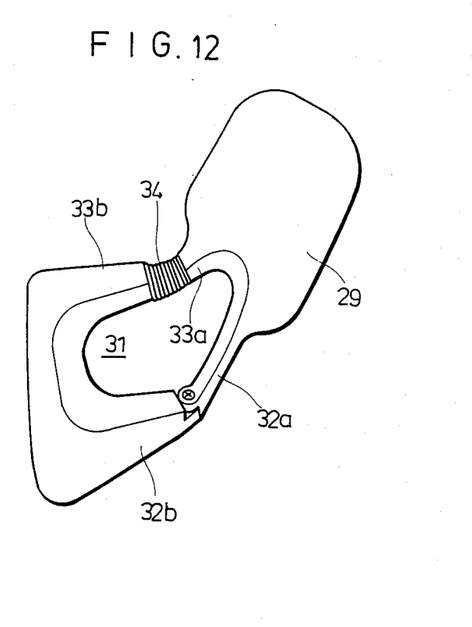
FIG. 12 is a perspective view for explaining an operation of the same back-mirror device.

FIGS. 10 to 12 show a third preferred embodiment of the present invention which has a nearly similar construction to the above-described second preferred embodiment, hence with respect to component parts common to the second preferred embodiment, they are given like reference numerals in the drawings, and detailed description thereof will be omitted. Only difference from the second preferred embodiment exists in that the housing side arm part 32a, and the fairing side arm part 32b are respectively provided with notched portions 32c and 32d, and these notched portions 32c and 32d are overlapped and coupled by means of a bolt 35 and a nut 36 so that the housing side arm portion 32a and the fairing side arm portion 32b may be freely rotatable relative to each other. In this case also, the arm member 30 is mounted to the side portion of the upper fairing 9a similarly to the second preferred embodiment, in the event that during running of the vehicle an external load exceeding a predetermined amount is applied to the side of the mirror 28 from the forth, the arm member 30 can immediately avoid the external load by the main arm portion 32 positioned at the forth being bent, hence a response characteristic to the external load applied from the forth is excellent, and the housing 29 can be firmly held by the arm member 30 similarly to the second preferred embodiment. Moreover, since a member 34 having a vibration absorbing characteristic is provided in the auxiliary arm portion 33, vibration of the mirror 28 caused by vibration of the vehicle body can be prevented.

Figure 13:
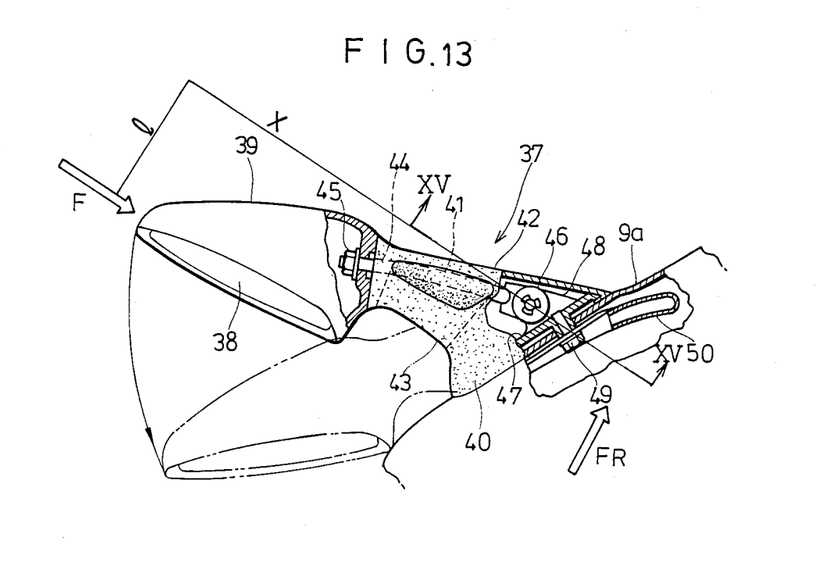
FIG. 13 is a plan view, partly cut away, of a back-mirror device according to a fourth preferred embodiment of the present invention.
Figure 14:
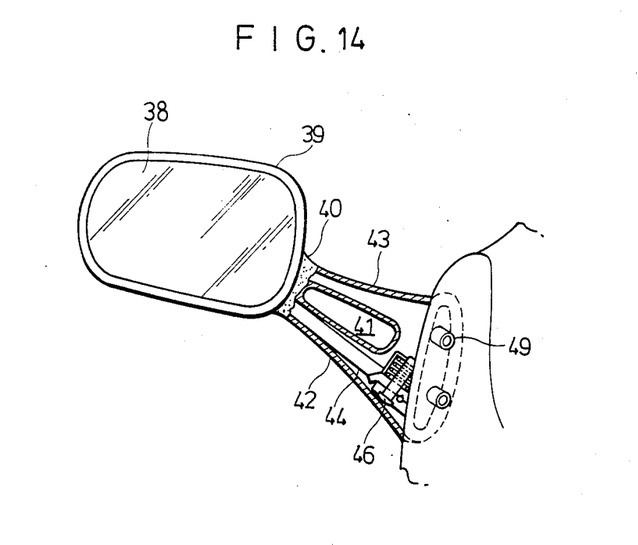
FIG. 14 is a rear view, partly cut away, of the same back-mirror device.
Figure 15:
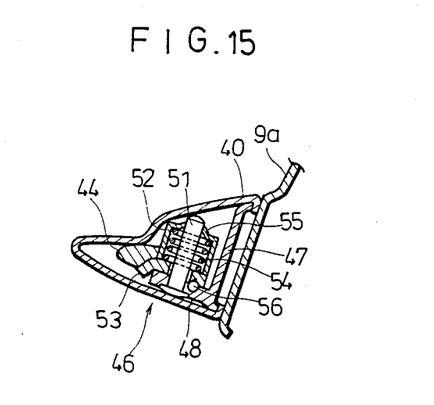
FIG. 15 is a cross-section view taken along line XV—XV in FIG. 13.

FIGS. 13 to 15 show a fourth preferred embodiment of the present invention. A back-mirror device 37 according to this fourth embodiment also consists of a housing 39, and an arm member 40 for connecting the housing 39 with the above-described upper fairing 9a. The arm member 40 is made of rubber and has a boot-shape. In the arm member 40 is formed an opening 41 which penetrates through the arm member in the forth and back direction, and by this opening 41 are formed a forth or forward lower main arm portion 42 and a rear upper auxiliary arm portion 43. In FIG. 13, arrow FR indicates the direction of the forth of the vehicle body.

A bar 44 extends within the main arm portion 42, one end of the bar 44 is threadedly secured to the housing 39 by means of a nut 45, and the other end is connected to a click mechanism 46. The click mechanism 46 is fixedly secured to a small protrusion 48 of a base member 47, and it is positioned very close to the base member 47. The base member 47 is firmly secured to the upper fairing 9a and a front cowl stay 50 at the inside thereof by means of a plurality of bolts 49. It is to be noted that the housing 39 can be adjusted in inclination in every direction by well-known means (not shown).

FIG. 14 is a rear view, partly in cross-section, of the back-mirror device 37 (as viewed by a driver), and it clearly shows that the bar 44 is accommodated in the main arm portion 42 of the arm member 40.

Returning now to FIG. 13, the click mechanism 46 for coupling the base member 47 and the bar 44 is positioned very close to the upper fairing 9a. The position of an external force (arrow F) exerted upon the housing 39 from the lateral direction is spaced by a distance l from a line X in the lateral direction which passes through the center of the click mechanism. Consequently, if the force F in the lateral direction is exerted upon the back-mirror device, the entire back-mirror device would easily tilt backwards at its foot portion. This tilting state is shown by double-dot chain lines in FIG. 13.

The auxiliary arm portion 43 has a cylindrical shape as shown in FIG. 14 and support the back-mirror device 37 from the rear by making use of a resilient effect of rubber. Since a large wind pressure is applied to the back-mirror device 37 during running, the support by the auxiliary arm portion 43 is important. The reason is because if the auxiliary arm portion 43 is not present, the click mechanism 46 must be made stiff by the corresponding amount and hence the swingability in the horizontal direction is degraded.

FIG. 15 is a cross-section view taken along line XV—XV in FIG. 13 as viewed in the direction of arrows, which shows details of a rachet or click mechanism 46. The click mechanism itself could be of any known structure. Briefly explaining, a pin 51 of the click mechanism 46 is fixedly secured to the protrusion 48 of the base member 47, and the bar 44 is connected via a bottom plate 53 to a cylinder 52 surrounding the pin 51. A spring 54 is accommodated in a compressed state within the space between the pin 51 and the cylinder 52, and the top end of the spring 54 is pressed by a stopper 55 that is fixedly secured to the pin 51. In addition, on the contact surfaces between the protrusion 48 and the bottom plate 53 are respectively formed recesses, and a ball 56 is accommodated in these recesses. Since this ball 56 is resiliently pressed between the protrusion 48 and the bottom plate 53, under a normal condition the bar 44 is fixed to the base member 47. However, if a force F in the lateral direction is applied to the back-mirror device 37, then a torque about the pin 51 is applied to the bar 44, hence when the force F exceeds the resilient resistance force of the spring 54, the bottom plate 53 would rise up, and the bar 44 would be rotated up to the point where the force F is not exerted upon the back-mirror device 37. In this way, the force F in the lateral direction is absorbed and mitigated by the click mechanism 46. In addition, by adjusting the spring 54 of the click mechanism, the initial movable torque can be set at any arbitrary value.

In the last-mentioned embodiment, since a rotatable coupling device, that is the click mechanism 46 is provided on the base member 47 and the housing 39 is disposed at the tip end of the bar 44 fixedly secured to that coupling device, when an external force in the lateral direction has been exerted upon the back-mirror device 37, the back-mirror device can tilt easily.

What is claimed is:

1. A rear view mirror assembly for a motorcycle having a front wheel steered by a handle bar and a fairing covering a front portion of said motorcycle with an upper portion of said fairing forward of said handle bar comprising: a housing, a mirror supported by said housing, a rubber arm mounting said housing to an upper side portion of said fairing higher than said handle bar, an opening extending through said arm from the forward side of said housing to the rear side of said housing, said opening defining upper and lower arm portions separated by said opening, a base member secured to said fairing;
a bar member extending through one of said upper and lower arm portions of said arm member separated by said opening; and having one end secured to said housing; and
a coupling device for coupling the other end of said bar member with said base member, whereby said arm member may be rotated relative to said base nearly in the horizontal direction.

2. A rear view mirror assembly as defined by claim 1, wherein said coupling device is a rachet mechanism permitting stepped angular movement of said bar member relative to said base member.

3. A rear view mirror assembly as defined by claim 1, wherein one of said upper and lower arm portions separated by said opening is disposed forward of the other arm portion.

* * * * *